(12) United States Patent
Emura et al.

(10) Patent No.: US 8,968,129 B2
(45) Date of Patent: *Mar. 3, 2015

(54) CHAIN GUIDE ASSEMBLY WITH DEFLECTABLE CONTACT MEMBER

(75) Inventors: Atsuhiro Emura, Sakai (JP); Yoshikazu Sugiyama, Sakai (JP); Hideki Ikemoto, Sakai (JP)

(73) Assignee: Shimano Inc., Sakai, Osaka (JP)

( * ) Notice: Subject to any disclaimer, the term of this patent is extended or adjusted under 35 U.S.C. 154(b) by 606 days.

This patent is subject to a terminal disclaimer.

(21) Appl. No.: 13/219,508

(22) Filed: Aug. 26, 2011

(65) Prior Publication Data

US 2013/0053195 A1    Feb. 28, 2013

(51) Int. Cl.
*B62M 9/00* (2006.01)
*F16H 7/18* (2006.01)
*B62M 9/16* (2006.01)

(52) U.S. Cl.
CPC ........... *B62M 9/16* (2013.01); *B62M 2009/007* (2013.01)
USPC .......................................... 474/140; 474/111

(58) Field of Classification Search
CPC ...................... B62M 9/16; B62M 2009/007
USPC .......................... 474/111, 140, 144
See application file for complete search history.

(56) References Cited

U.S. PATENT DOCUMENTS

| | | | |
|---|---|---|---|
| 6,533,690 B2 * | 3/2003 | Barnett | 474/140 |
| 2007/0207886 A1 | 9/2007 | Shahana | |
| 2008/0252037 A1 | 10/2008 | Wesling | |
| 2008/0254929 A1 | 10/2008 | Wesling | |
| 2009/0062049 A1 * | 3/2009 | Cranston et al. | 474/144 |
| 2011/0160013 A1 | 6/2011 | Wehage | |
| 2011/0203867 A1 * | 8/2011 | Kakimoto et al. | 180/357 |
| 2012/0142469 A1 * | 6/2012 | Barefoot et al. | 474/139 |
| 2013/0217527 A1 * | 8/2013 | Graziosi et al. | 474/140 |

FOREIGN PATENT DOCUMENTS

| | | |
|---|---|---|
| CN | 1093816C C | 11/2002 |
| EP | 1764297 A1 | 3/2007 |

* cited by examiner

*Primary Examiner* — William E Dondero
*Assistant Examiner* — Diem Tran
(74) *Attorney, Agent, or Firm* — Jeffer Mangels Butler & Mitchell LLP; Brennan C. Swain, Esq.

(57) ABSTRACT

A bicycle chain guide assembly that includes a chain guide member having a mounting portion adapted to be positioned adjacent a chain ring of a bicycle, and a contact member removably affixed to the mounting portion. The mounting portion extends in a chain-running direction and has a chain-ring side and an opposite side. The contact member includes a first end portion affixed to the mounting portion and a chain contact portion that extends from the first end portion in the chain-running direction and is positioned adjacent the chain-ring side of the mounting portion. A gap is defined between the chain-ring side of the mounting portion and the chain contact portion of the contact member.

18 Claims, 9 Drawing Sheets

CHAIN GUIDE ASSEMBLY WITH DEFLECTABLE CONTACT MEMBER

FIELD OF THE INVENTION

The present invention relates to a chain guide assembly for a bicycle.

BACKGROUND OF THE INVENTION

Currently, chain guide assemblies such as shown in U.S. Pat. No. 6,533,690, which is incorporated by reference herein in its entirety, are typically installed on bicycles that encounter bumpy situations and are used to keep the chain on the chain ring of the front drive train. However, a more stable, lightweight and quieter chain guide assembly is desired. The invention described herein addresses these issues.

SUMMARY OF THE PREFERRED EMBODIMENTS

In accordance with a first aspect of the present invention there is provided a bicycle chain guide assembly that includes a chain guide member having a mounting portion adapted to be positioned adjacent a chain ring of a bicycle, and a contact member removably affixed to the mounting portion. The mounting portion extends in a chain-running direction and has a chain-ring side and an opposite side. The contact member includes a first end portion affixed to the mounting portion and a chain contact portion that extends from the first end portion in the chain-running direction and is positioned adjacent the chain-ring side of the mounting portion. A gap is defined between the chain-ring side of the mounting portion and the chain contact portion of the contact member. In a preferred embodiment, the contact member is made of a resilient material such that it can be deflected and the contact member is positioned. On the mounting portion by sliding the contact member in a sliding direction that is perpendicular to the chain-running direction. In a preferred embodiment, when the assembly is mounted on a bicycle, the chain-ring side of the mounting portion has a first curvature protruding toward the chain-ring and the chain contact portion of the contact member has a second curvature protruding toward the chain-ring. The first curvature and the second curvature are selected such that the gap is defined therebetween. The chain guide member includes circumferentially arranged slots for adjustable attachment to a bicycle bottom bracket.

In accordance with another aspect of the present invention, there is provided a bicycle chain guide assembly that includes a mounting bracket adapted to be affixed to a bicycle, and a movable member movably mounted to the mounting bracket. The movable member includes a chain guide portion adapted to be positioned adjacent a chain ring of the bicycle and below a bottom bracket of the bicycle. When the assembly is mounted on a bicycle with a chain-ring, the movable member can move in a first direction such that the chain guide portion moves toward an outer circumference of the chain-ring and the movable member can move in a second direction such that the chain guide portion moves away from the outer circumference of the chain ring. Preferably, the assembly includes first and second limit constructions that include a pin provided on the mounting bracket and a slot provided on the movable member that receives the pin. In another embodiment, the movable member is movably mounted to the mounting bracket such that it moves upwardly and downwardly via slots defined therein.

The invention, together with additional features and advantages thereof, may be best understood by reference to the following description.

DETAILED DESCRIPTION OF THE PREFERRED EMBODIMENTS

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be appreciated that terms such as "front," "back," "top," "bottom," "side," "short," "long," "up," "down," and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-7 show a chain guide assembly 10 for a bicycle that generally includes a mounting bracket 12, and movable member 14 together with a chain guide portion 31. In a preferred embodiment, the chain guide assembly 10 is mounted on the bottom bracket 100 of a bicycle. However, this is not a limitation on the present invention, and the chain guide assembly can be affixed to or mounted on other parts of a bicycle.

Figure 1:
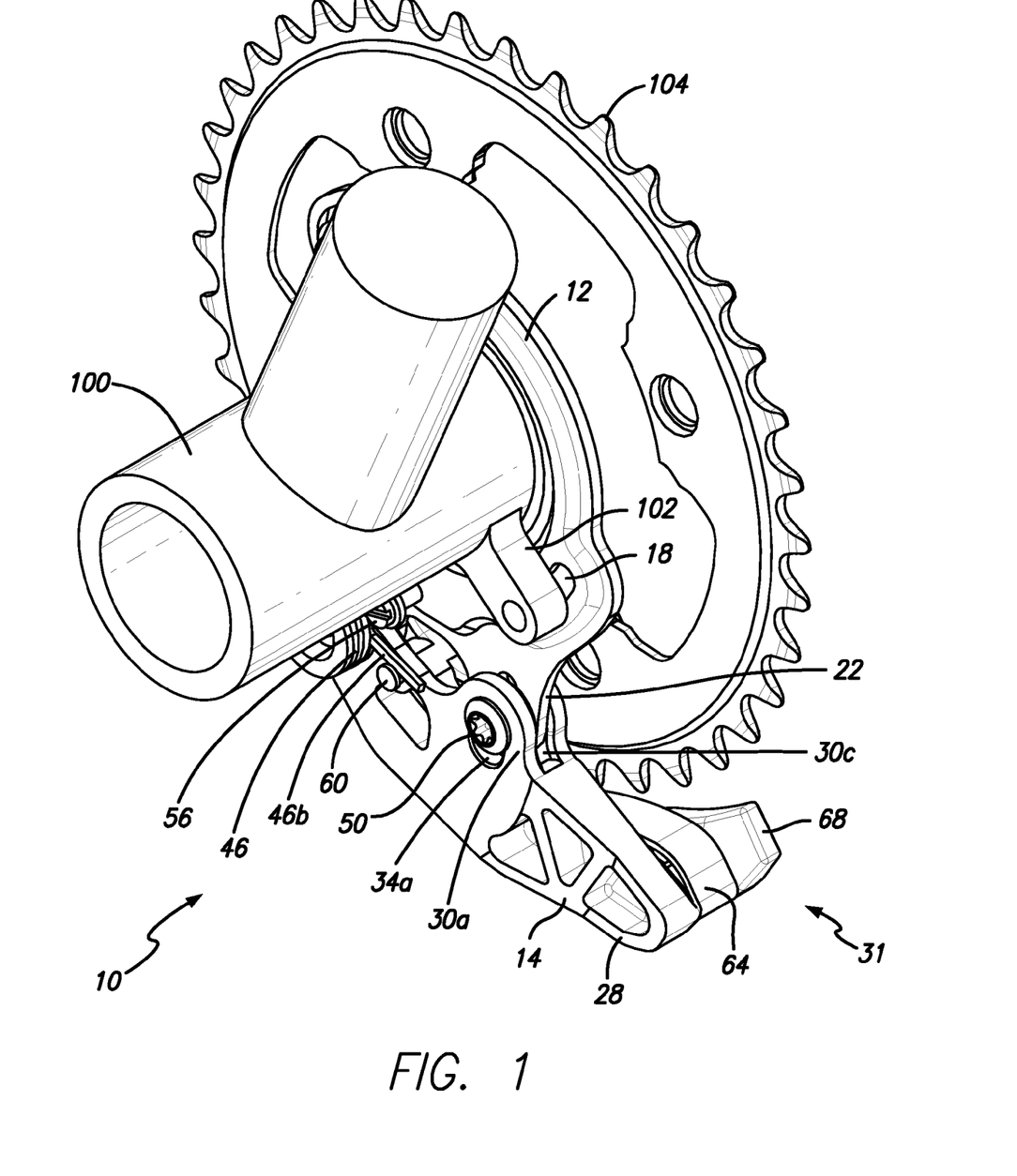
FIG. 1 is a perspective view of a chain guide assembly affixed to the bottom bracket of a bicycle in accordance with a first preferred embodiment of the present invention.
Figure 2:
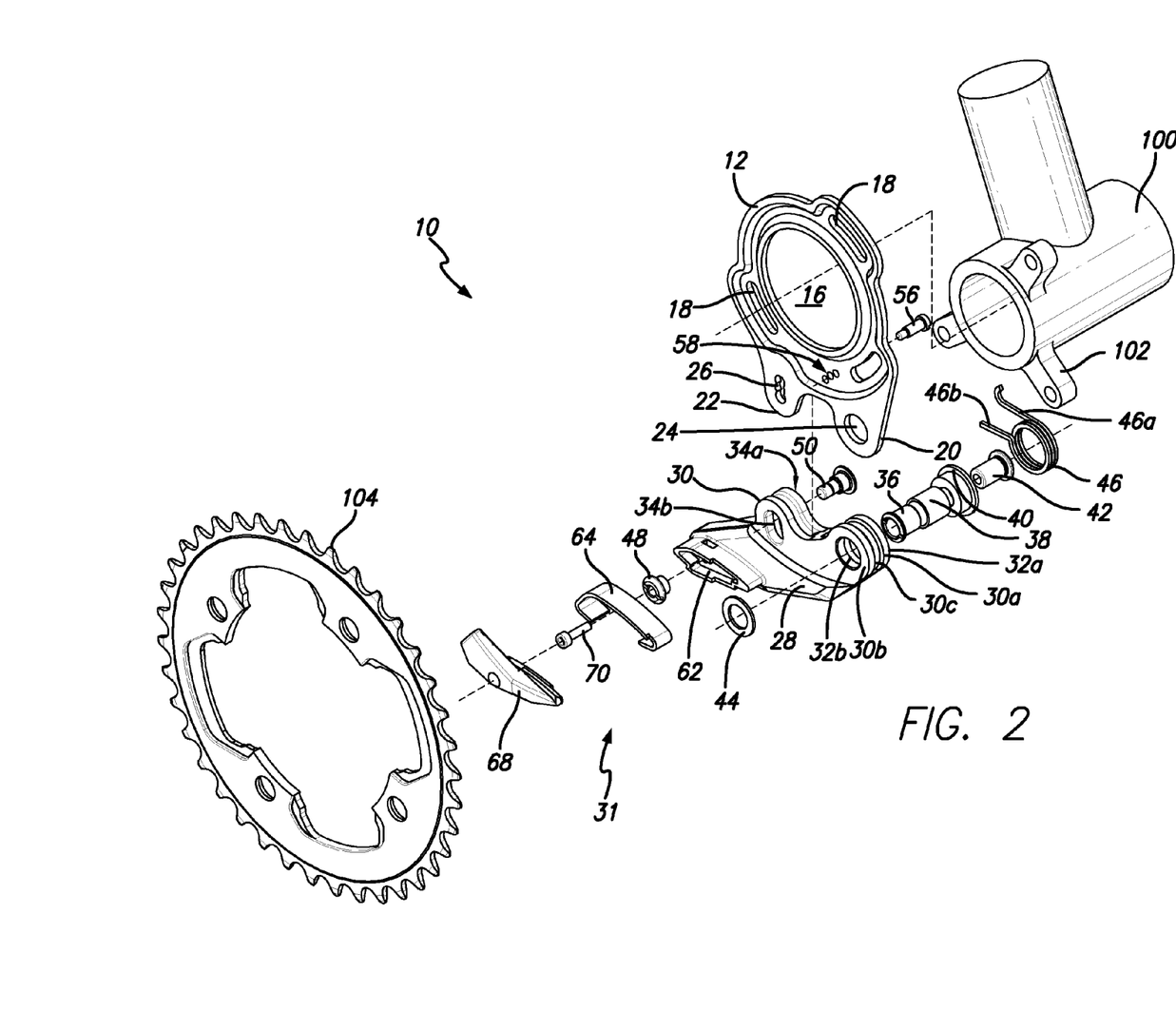
FIG. 2 is an exploded view of the chain guide assembly of FIG. 1.

As shown in FIG. 2, a bottom bracket 100 includes bosses 102 to which the mounting bracket 12 is adapted to be affixed. In a preferred embodiment, the mounting bracket has a generally circular shape with a center opening 16 through which a crank can extend, along with three circumferentially arranged slots 18 for mounting the mounting bracket 12 to the bosses 102 via threaded fasteners or the like. As will be appreciated by those skilled in the art, the slots 18 allow for adjustability. In another embodiment, the slots can be replaced by circular openings that align with the bosses 102. The mounting bracket 12 preferably includes bosses 20 and 22 that have openings 24 and 26 therein for mounting the movable member 14 thereto, as described below. As shown in FIG. 2, in a preferred embodiment, mounting bracket 12 includes more than one (three are shown) opening 26. This provides adjustability as described below. In another embodiment, only one opening 26 is provided.

As is shown in FIG. 2, in a preferred embodiment, the movable member 14 includes a lower portion 28, an upper portion 30 that is divided into first and second halves 30a and 30b with a gap 30c defined therebetween, and a mounting member 62 (which is part of the chain guide portion 31). The movable member 14 also includes openings 32a and 32b and slots 34a and 34b defined in first and second halves 30a and 30b of the upper portion 30. The openings and slots are referred to herein both separately as openings 32a and 32b, slots 34a and 34b and together as an opening 32 and a slot 34.

To mount the movable member 14 to the mounting bracket 12, bosses 20 and 22 are received in slot 30c such that openings 32a and 32b are aligned with opening 24 and slots 31a and 31b are aligned with at least one of the openings 26. Pins or the like are inserted through the aligned openings and slots to secure the movable member 14 to the mounting bracket 12. It will be understood that any type of pin, threaded fastener, rivet or other component known in the art can be used to secure the movable member 14 to the mounting bracket 12. This is not a limitation on the present invention. In the figures, openings 32a and 32b and opening 24 receive a nut 36, spacer 38, sleeve 40, bolt 42, washer 44 and biasing member 46 (described below and mounted on sleeve 40) and slots 34a and 34b and openings 26 receive a nut 18 and bolt 50 to movably mount the movable member 14 to the mounting bracket 12. In an alternative embodiment, one of the two halves 30a and 30b can be omitted. It will understood that when the mounting bracket 12 and movable member 14 are mounted on a bicycle, the chain guide portion 31 will be positioned adjacent an outer most chain-ring 104 of a plurality of chain rings (or a single chain-ring 104 on bicycles with only one chain-ring 104).

Figure 5:
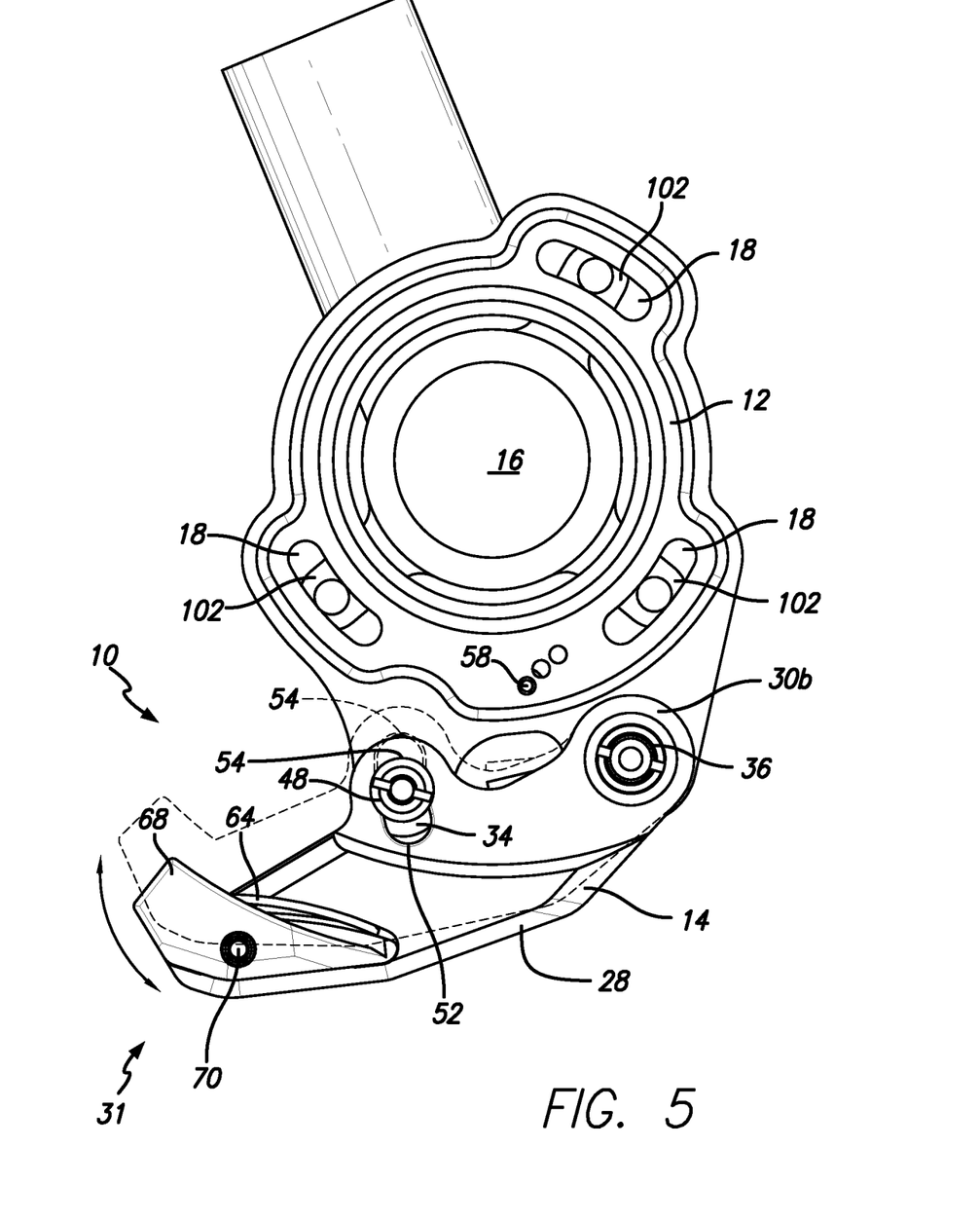
FIG. 5 is a right side elevational view of the chain guide assembly of FIG. 1 with the chain-ring omitted and the movable member in solid and dashed lines to show its pivotal action.
Figure 6:
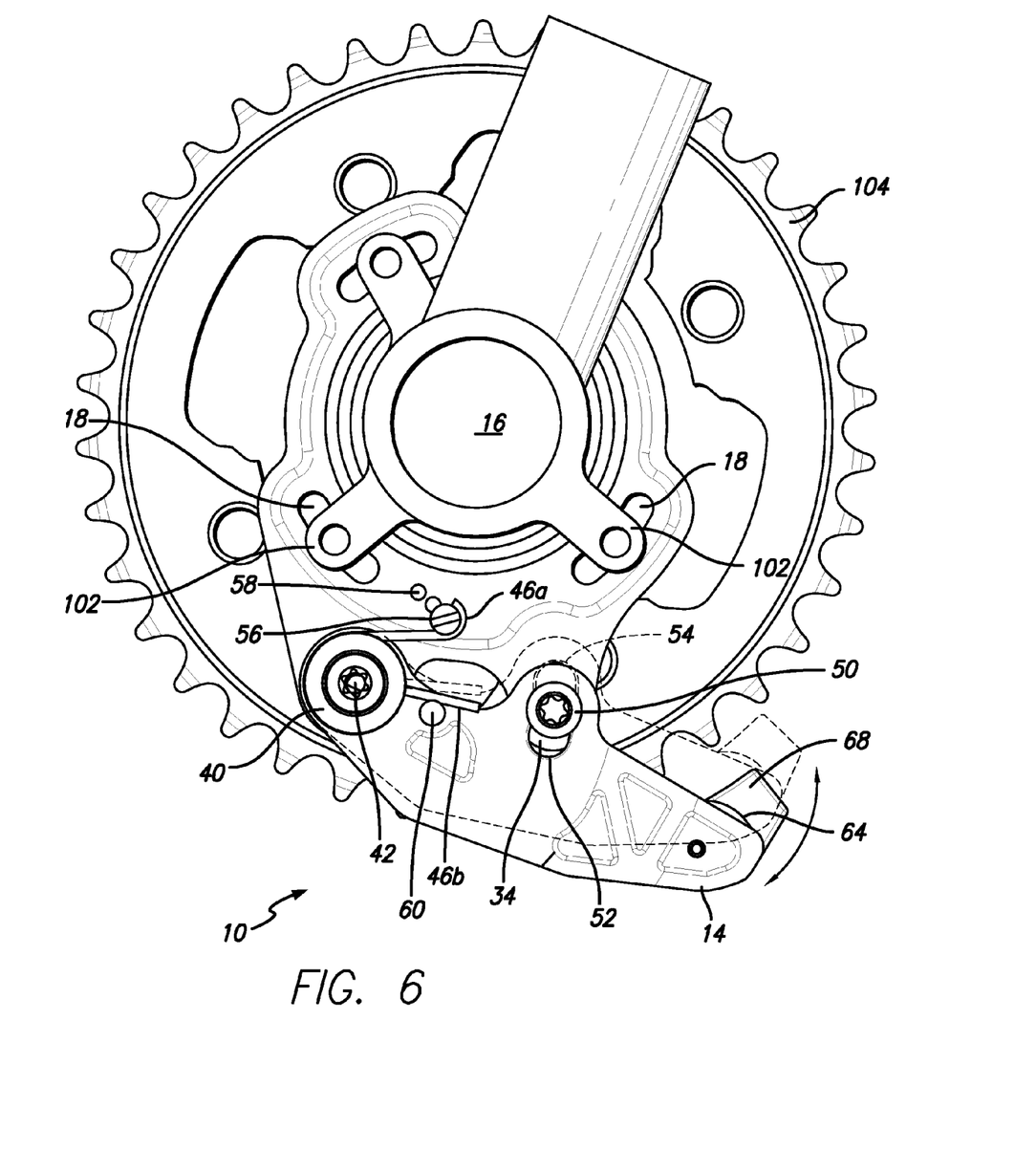
FIG. 6 is a left side elevational view of chain guide assembly of FIG. 1 with the movable member in solid and dashed lines to show its pivotal action.

It will be appreciated by those skilled in the art, that in the configuration described above, nut 36, spacer 38, sleeve 40, and bolt 42 define a pivot axis about which the movable member 14 can pivot, swing or move and nut 48 and bolt 50 move up and down within slots 34a and 34b as the movable member pivots about the pivot axis. As shown by the arrows in FIGS. 5 and 6, the movable member 14 can move in a first direction such that the chain guide portion 31 moves toward the chain-ring 104 and in a second direction such that the chain guide portion 31 moves away from the chain ring 14. In its simplest form, the assembly 10 includes a pin (called a first pin or pivot assembly herein) that defines a pivot axis about which the movable member 14 can pivot, and a pin (called a second pin or sliding assembly herein) that moves upwardly and downwardly and is bounded by the two ends of the slot(s), which are referred to herein as the upper limit 52 and the lower limit 54. FIGS. 5 and 6 show the movable member 14 in both dashed and solid lines. The solid lines represent the movable member 14 in the normal position where it is biased downwardly and at the lower limit (with bolt 50 and nut 48 at the lower limit 54 of slot 34). The dashed lines represent the movable member 14 in the action position (e.g., after being hit by a tree stump) where it is moved upwardly and at the upper limit (with bolt 50 and nut 48 at the upper limit 52 of slot 34). In another embodiment, the pin and slot arrangement can be reversed such that the slot is defined in mounting bracket 12 and the pin or the like extends from the movable member 14.

It will be understood that other constructions for limiting the movement of the movable member 14 in the first and second directions are within the scope of the present invention. For example, the assembly 10 can include stoppers or abutments affixed to the mounting bracket 12, that are positioned above and below the movable member 14 and that limit its movement.

As discussed above, the pivot assembly includes a biasing member 46 or spring coaxially disposed about the pivot assembly (and, thereby, the pivot axis). The biasing member 46 includes a first end portion 46a that contacts the mounting bracket 12 and a second end portion 46b that contacts the movable member 14. In a preferred embodiment, the mounting bracket includes a pin or bolt 56 that is threaded into or otherwise attached thereto or formed therewith. As is shown in FIG. 6, the first end portion 46a of the biasing member 46 contacts the bolt 56. In a preferred embodiment, the bolt 56 is threaded into an opening 58 in the mounting bracket 12. Preferably, the mounting bracket 12 includes more than one opening 58 defined therein (three are shown). This provides adjustability. However, this is not a limitation on the present invention. In a preferred embodiment, the movable member 14 includes a pin 60 secured thereto, which is contacted by the second end 46b of the biasing member 46. As shown in FIG. 6, pin 60 is a unitary part of movable member 14. However, this is not a limitation on the present invention and pin 60 could be threaded or otherwise attached to movable member 14.

It will be appreciated that the first and second ends 46a and 46b of the biasing member 46 contacting bolt 56 and pin 60 biases movable member 14 downwardly, and, when mounted on a bicycle, away from chain-ring 104 (the second direction, as described above). Therefore, in the normal position, the chain guide portion 31 is biased downwardly and the sliding assembly/pin is positioned at the lower limit 54 of slot 34. When the chain guide portion 31 or any part of the movable member 14 is struck by an object, such as a tree, rock, mound, etc., the movable member 14 pivots upwardly (in the first direction) as much as necessary unless the sliding assembly/pin reaches the upper limit 52 of slot 34. This helps protect the drain guide portion 31 from damaging the chain or chain-ring.

Figure 3:
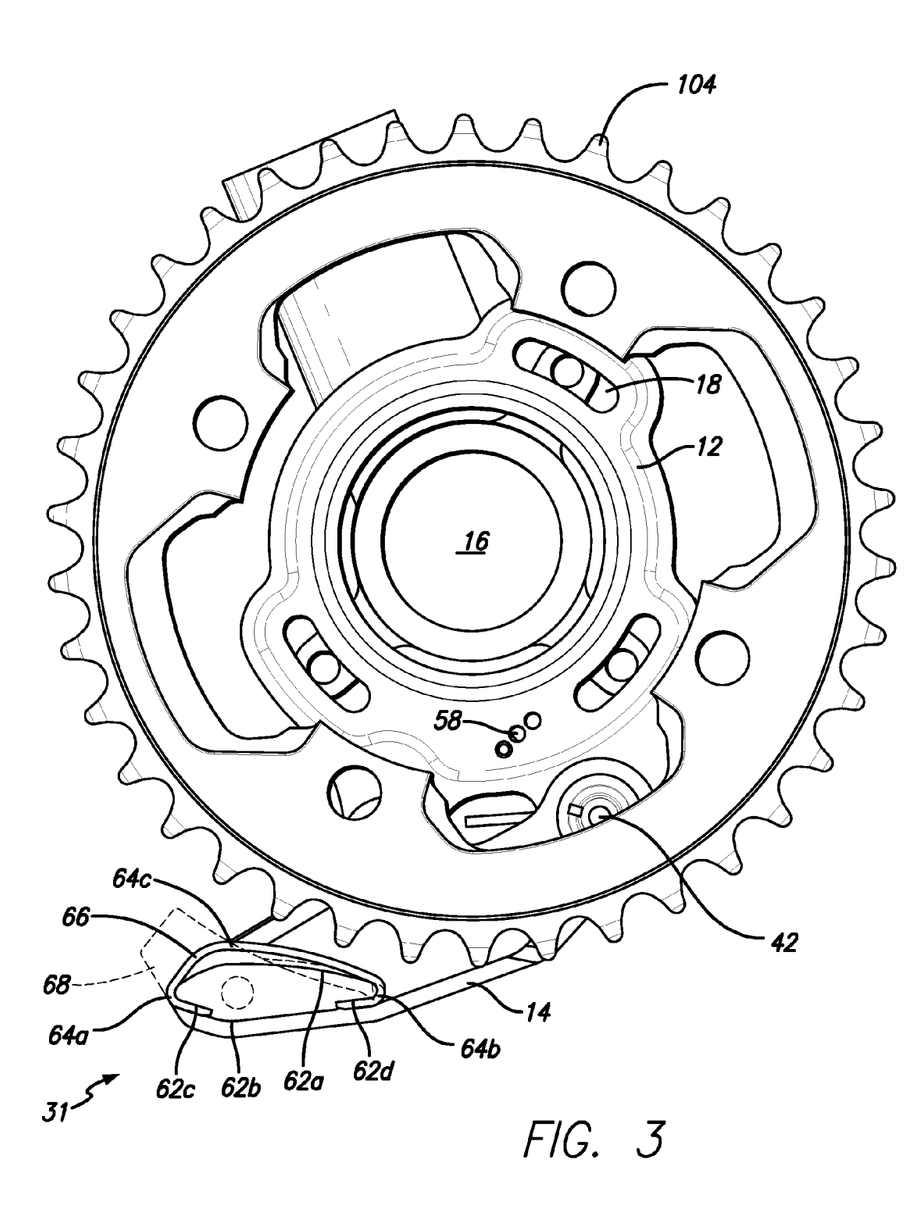
FIG. 3 is a right side elevational view of the chain guide assembly of FIG. 1.
Figure 4:
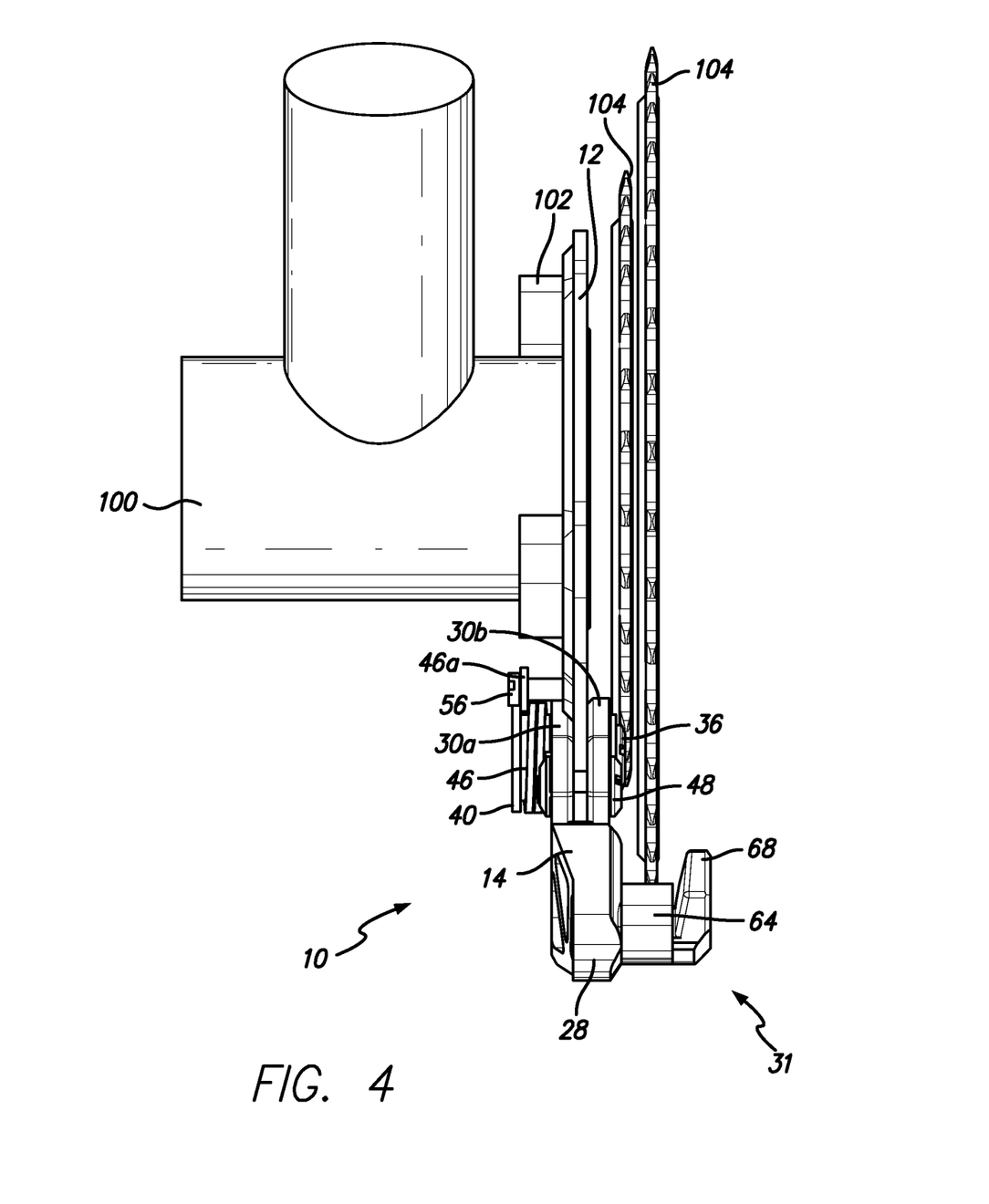
FIG. 4 is a rear elevational view of the chain guide assembly of FIG. 1.

As shown in FIGS. 1-7, in a preferred embodiment, the chain guide portion 31 includes a mounting portion 62 that extends outwardly from the movable member 14, and a contact member or skid plate 64 and guard member 68, that are affixed to the mounting portion 62. Generally, the contact member 64 is positioned on the mounting portion 62 and below the chain and is designed to deflect when contacted by the chain when the bicycle is in use. The mounting portion 62 includes a chain-ring side 62a and an opposite side 62b (top and bottom, respectively, as shown in FIG. 3). In a preferred embodiment, the contact member 64 includes first and second end portions 64a and 64b with a chain contact portion 64c extending therebetween. It will be understood that the chain contact portion 64c generally extends in the direction that the chain runs or extends (the chain-running direction). Preferably, the mounting portion 62 includes first and second seats 62c and 62d that receive at least a portion of the first and second end portions 64a and 64b of the contact member 64. In a preferred embodiment, the contact member 64 is slid onto the mounting portion 62 in a direction substantially perpendicular to the chain-running direction. However, this is not a limitation. In another embodiment, the contact member 64 can be snap fit onto the mounting portion 62.

As is best shown in FIG. 3, in a preferred embodiment, the upper surface or chain-ring fixing side of the mounting portion 62a has a first curvature protruding toward the chain-ring and the chain contact portion 64c of the contact member 64 has a second curvature protruding toward the chain-ring. The first curvature and the second curvature are selected such that a gap 66 is defined therebetween. Preferably, the curvatures are convex. However, they may both be concave or one may be concave and the other convex or one may be flat and the other convex. Any arrangement that provides a gap therebetween is within the scope of the present invention. In use, when the chain contacts the chain contact portion 64c, the chain contact portion 64c deflects downwardly, thereby narrowing the gap 66. This action helps prevent damage to the chain and reduces noise. Also, if the contact member 64 becomes worn, a user can replace the contact member 64 with a new one. The contact member 64 can be made of any resilient material that is flexible enough to deflect as desired, such as resin or the like. In another embodiment, the contact member 64 and mounting portion 62 can be a unitary piece that still provides deflection when the contact member 64 is contacted by a chain.

In a preferred embodiment, the chain guide portion 31 also includes a guard member 68 is affixed to the mounting portion 62 by a threaded fastener 70 or the like. At least a portion of the guard member extends toward the chain ring beyond or above a top surface of the contact member 64. In a preferred embodiment of the invention, to replace the contact member 64, a user removes the threaded fastener 70 and guard member 68, slides off the worn contact ember 64 and slides, a new contact member 64 and reattaches the threaded fastener 70 and guard member 68.

The combined action of both the movable member 14 and the deflection of the contact member 64 provides protection for the chain and the chain-ring.

Figure 7:
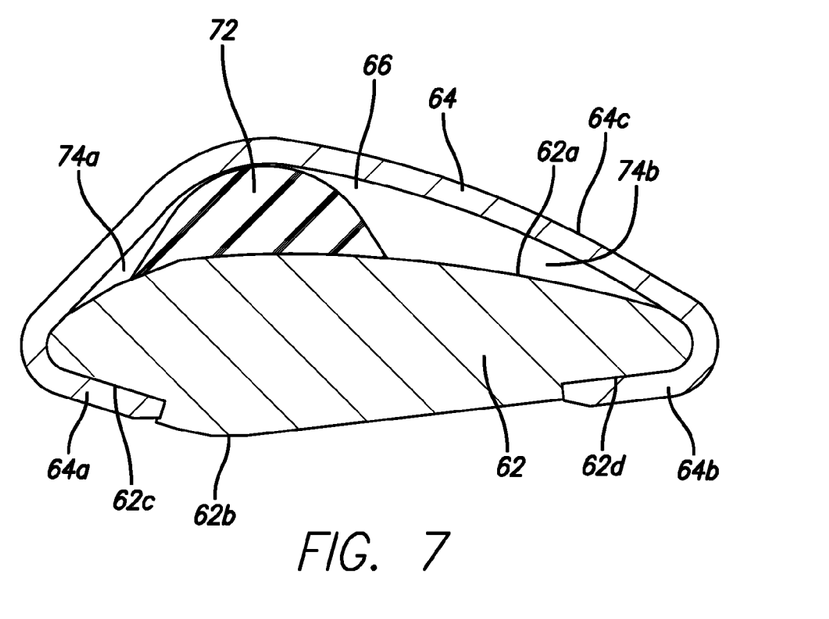
FIG. 7 is a detailed view of the chain guide portion including an insert member in accordance with a preferred embodiment of the present invention.

As shown in FIG. 7, in another embodiment, the chain guide portion 31 can include an insert member 72 disposed in the gap 66 between the mounting portion 62 and the contact member 64. The insert member 72 is preferably made of rubber or other resilient material and provides cushion or further resilience when the chain contacts the contact member 64. As shown in FIG. 7, in a preferred embodiment, the insert member 72 divides gap 66 into first and second spaces 74a and 74b. This provides room for insert member 72 to deflect when compressed. In another embodiment, insert member 72 can completely fill gap 66.

Figure 8:
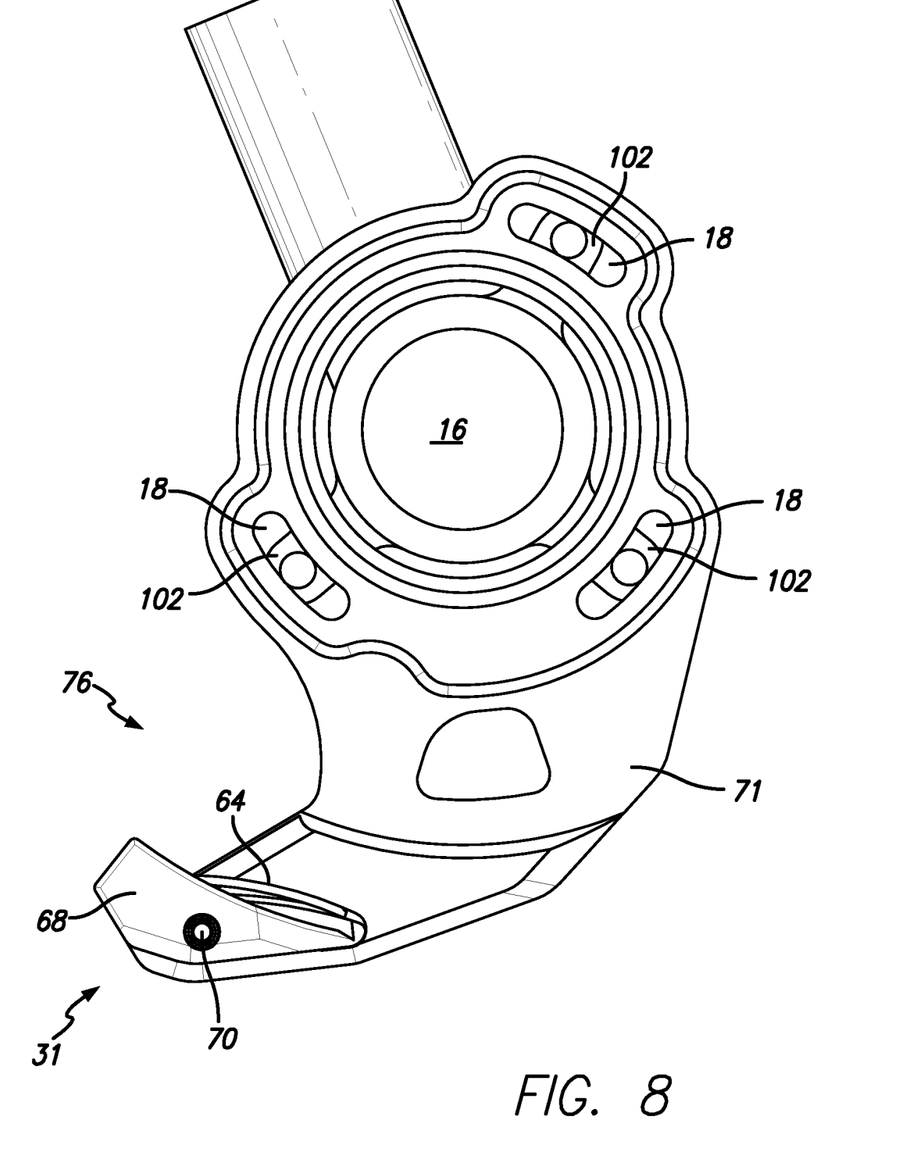
FIG. 8 is a right side elevational view of a chain guide assembly affixed to the bottom bracket of a bicycle in accordance with another preferred embodiment of the present invention.

As shown in FIG. 8, in another embodiment of a chain guide assembly 76 the chain guide portion 31 can extend from a mounting bracket or chain guide member 71 that is affixed to the bicycle and positions the chain guide portion 31, including the contact member 64 adjacent to the chain-ring 104 and chain. This embodiment essentially eliminates the movable member 14.

Figure 9:
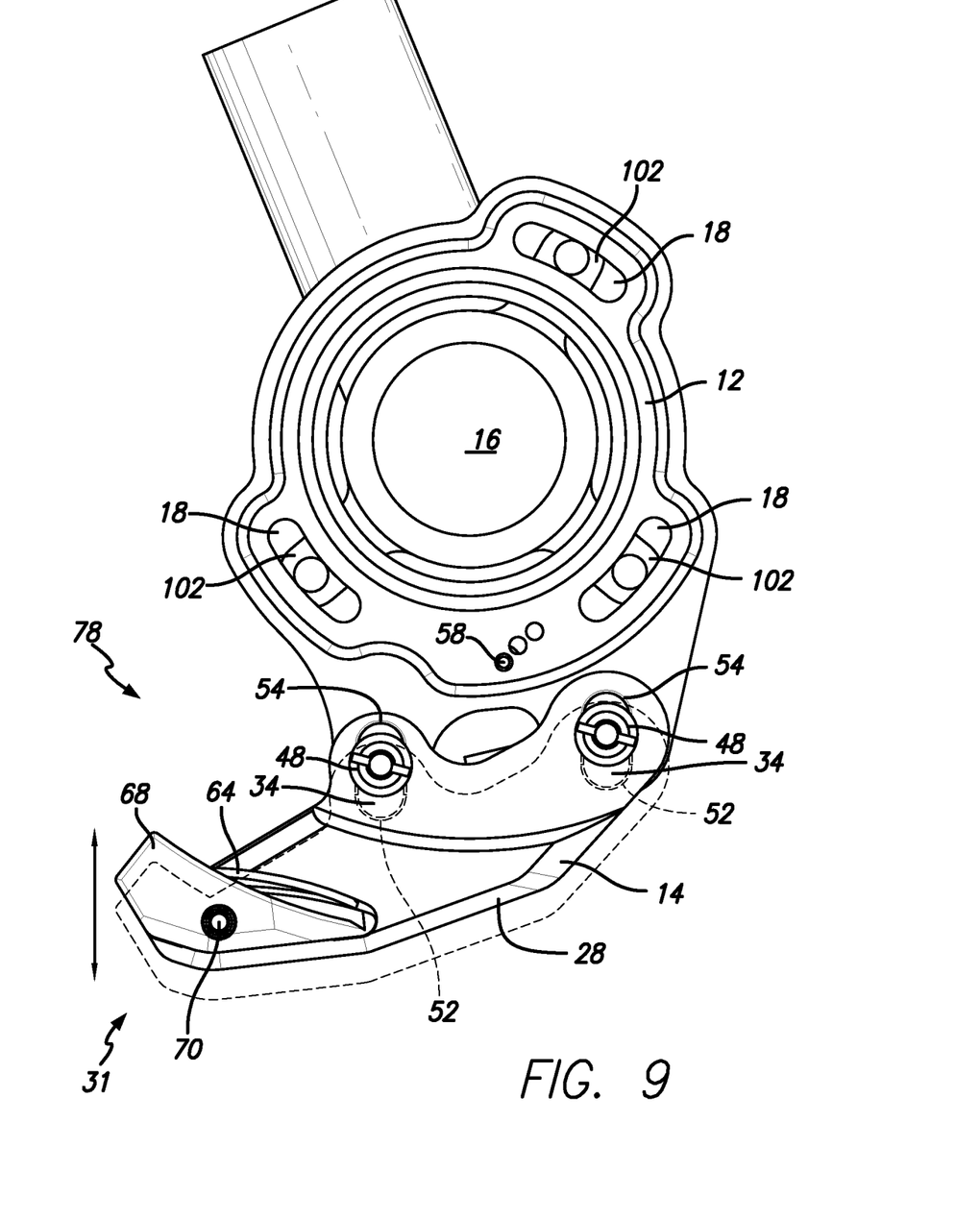
FIG. 9 is a right side elevational view of a chain guide assembly affixed to the bottom bracket of a bicycle in accordance with yet another preferred embodiment of the present invention.

As shown in FIG. 9, in an alternative embodiment, the movable member 14 can include two slots 34 instead of a slot and opening combination. It will be understood that with this construction, the entire movable member 14 moves upwardly and downwardly instead of pivoting upwardly and downwardly about a pivot axis. In this embodiment, the movable member 14 is biased downwardly. Any number of configurations can be used to bias the movable member 14 downwardly. For example, each pin or bolt 50 within the slots 34 can include a biasing member similar to biasing member 46 above. Or, a single biasing member or coil spring can be used to bias the entire movable member 14 downwardly. Any configuration where the movable member 14 has an upper limit construction and a lower limit construction is within the scope of the invention. FIG. 9 shows the movable member in solid lines in the action position and in dashed lines in the normal position.

Those of skill in the art will appreciate from a review of the description and drawings herein, that the chain guide assemblies disclosed herein supply a degree of adjustability, by providing, e.g., slots 18 so the mounting bracket 12 or chain guide member 71 can be rotated or more than one opening 26 or 58 for repositioning bolts 50 and 56. Other adjustment possibilities will be readily apparent to those of skill in the art.

It will be understood that there are essentially two different invention disclosed herein, the up and down movement of the movable member and the deflectable action of the contact member. Both of these can be combined into one chain guide assembly, or they can be implemented separately. In an embodiment, where the contacted member is omitted, the chain guide portion can simply include a surface on which the chain can slide if contacted (without any deflection) or a small chain ring or the like.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶116 will begin with the words "means for"). Accordingly, the applicant reserves the right to add additional claims after filing the application to pursue such additional claim forms for other aspects of the disclosure.

Accordingly, although exemplary embodiments of the invention have been shown and described, it is to be understood that all the terms used herein are descriptive rather than limiting, and that many changes, modifications, and substitutions may be made by one having ordinary skill in the a without departing from the spirit and scope of the invention.

What is claimed is:
1. A bicycle chain guide assembly comprising:
a chain guide member that includes a mounting portion adapted to be positioned adjacent a chain ring of a bicycle, wherein the mounting portion extends in a chain-running direction, and wherein the mounting portion has a, chain-ring side and an opposite side, and
a contact member removably affixed to the mounting portion, wherein the contact member includes a first end portion affixed to the mounting portion and a chain contact portion that extends from the first end portion in the chain-running direction and is positioned adjacent the chain-ring side of the mounting portion,
wherein a gap is defined between the chain-ring side of the mounting portion and the chain contact portion of the contact member, wherein the contact member is configured to deflect when contacted by the chain such that the gap is narrowed.

2. The bicycle chain guide assembly of claim 1 wherein the contact member further includes a second end portion that is affixed to the mounting portion, wherein the chain contact portion is disposed between the first and second end portions.

3. The bicycle chain guide assembly of claim 2 wherein the contact member is positioned on the mounting portion by sliding the contact member in a sliding direction that is perpendicular to the chain-running direction.

4. The bicycle chain guide assembly of claim 1 wherein the contact member is made of a resilient material such that it can be deflected.

5. The bicycle chain guide assembly of claim 4 further comprising an insert member disposed between the contact member and the mounting portion and that fills at least a portion of the gap.

6. The bicycle chain guide assembly of claim 5 wherein the insert member is positioned in a center portion of the gap, thereby defining first and second spaces on both sides thereof, respectively.

7. The bicycle chain guide assembly of claim 5 wherein the insert member comprises an elastic material.

8. The bicycle chain guide assemble of claim 7 wherein the insert member comprises rubber.

9. The bicycle chain guide assembly of claim 1 further comprising a guard member that is attached to the mounting portion, wherein when the assembly is mounted on a bicycle, at least a portion of the guard member extends toward the chain ring beyond a top surface of the contact member.

10. The bicycle chain guide assembly of claim 1 wherein when the assembly is mounted on a bicycle, the chain-ring side of the mounting portion has a first curvature protruding toward the chain-ring and the chain contact portion of the contact member has a second curvature protruding toward the chain-ring, wherein the first curvature and the second curvature are selected such that the gap is defined therebetween.

11. The bicycle chain guide assembly of claim 1 wherein when the assembly is mounted on a bicycle, the mounting portion is arranged adjacent an outer most chain ring of a plurality of chain rings.

12. The bicycle chain guide assembly of claim 1 wherein the chain guide member includes circumferentially arranged slots for adjustable attachment to a bicycle bottom bracket.

13. The bicycle chain guide assembly of claim 1 wherein the chain guide member is configured to position the mounting portion and contact member at a location that is outside an outer diameter of the chain ring in a radial direction.

14. The bicycle chain guide assembly of claim 13 wherein the gap is defined between the between the mounting portion and the contact member in a radial direction.

15. The bicycle chain guide assembly of claim 13 wherein when the assembly is mounted on a bicycle, with respect to the chain ring, the chain-ring side of the mounting portion is positioned radially outwardly of the chain contact portion of the contact member.

16. The bicycle chain guide assembly of claim 1 wherein the chain guide member is configured to position the mounting portion and contact member at a location that is outside an outer boundary of the chain.

17. A bicycle chain guide assembly comprising:
a chain guide member that includes a mounting portion extending from an inner surface thereof, wherein the mounting portion has a chain-ring side and an opposite side, and a contact member removably affixed to the mounting portion, wherein the contact member includes first and second end portions that are affixed to the mounting portion and a chain contact portion that extends between the first and second end portions, wherein a gap is defined between the chain-ring side of the mounting portion and the chain contact portion of the contact member, wherein the chain guide member is adapted to position the mounting member and contact member radially outwardly of a chain ring of a bicycle such that when a chain on the chain ring contacts the contact member the gap is narrowed.

18. The bicycle chain guide assembly of claim 17 wherein when the assembly is mounted on a bicycle, with respect to the chain ring, the chain-ring side of the mounting portion is positioned radially outwardly of the chain contact portion of the contact member.

* * * * *